United States Patent
Schofield

(10) Patent No.: US 6,254,163 B1
(45) Date of Patent: Jul. 3, 2001

(54) VEHICLE SEAT TRACK ATTACHMENT ASSEMBLY

(75) Inventor: Graham Schofield, Sandiacre (GB)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/571,070

(22) Filed: May 15, 2000

(51) Int. Cl.$^7$ .................................................. B60N 2/07
(52) U.S. Cl. ................... 296/65.13; 248/222.11; 248/429; 248/503.1
(58) Field of Search .............. 296/65.03, 65.13, 296/65.14; 248/429, 222.11, 503.1

(56) References Cited

U.S. PATENT DOCUMENTS

| | | | |
|---|---|---|---|
| 3,756,637 | * 9/1973 | Wildi | 248/222.11 X |
| 3,806,191 | * 4/1974 | Stegmaier | 248/429 X |
| 4,395,011 | 7/1983 | Torta . | |
| 4,422,690 | 12/1983 | Kopich . | |
| 4,423,904 | 1/1984 | Crawford . | |
| 4,569,563 | 2/1986 | Fourrey . | |
| 4,583,782 | * 4/1986 | Mikuniya | 248/503.1 X |
| 5,011,209 | 4/1991 | Takarabe et al. . | |
| 5,076,529 | 12/1991 | Dove et al. . | |
| 5,169,091 | 12/1992 | Beroth . | |
| 5,372,398 | 12/1994 | Aneiros et al. . | |
| 5,407,166 | 4/1995 | Pilarski . | |
| 5,871,318 | 2/1999 | Dixon et al. . | |
| 5,961,089 | 10/1999 | Soisnard . | |

FOREIGN PATENT DOCUMENTS

508017 * 6/1939 (GB) ..................................... 248/429

* cited by examiner

Primary Examiner—Dennis H. Pedder
(74) Attorney, Agent, or Firm—Brooks & Kushman P.C.

(57) ABSTRACT

A seat track attachment assembly for attachment to an aperture in a vehicle floor pan includes a seat track having an opening therein. An attachment bolt extends through the floor pan aperture and the seat track opening. The bolt has a shaft and a head with a head width narrower than the opening. A fixation spring is positioned around the shaft and abuts the head to secure the seat track to the floor pan.

11 Claims, 1 Drawing Sheet

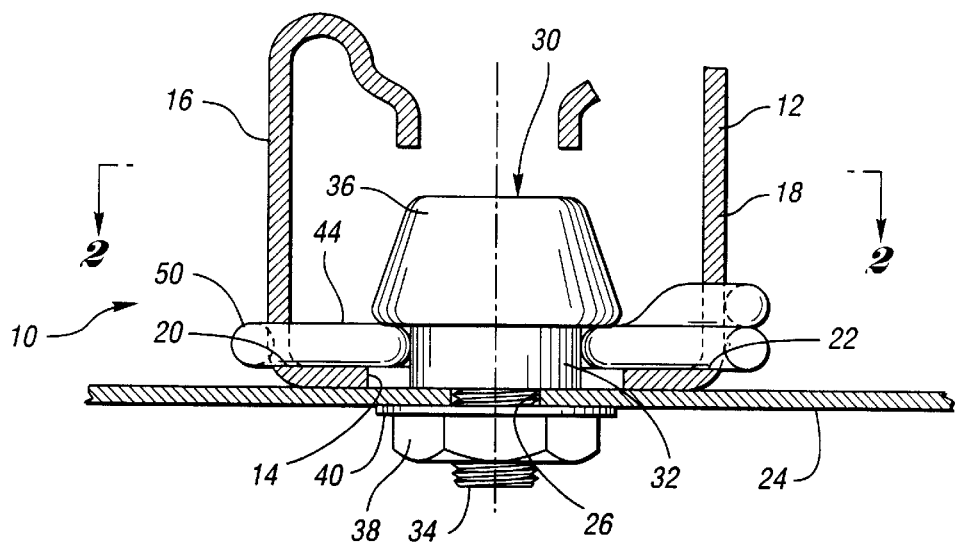
*Fig. 1*
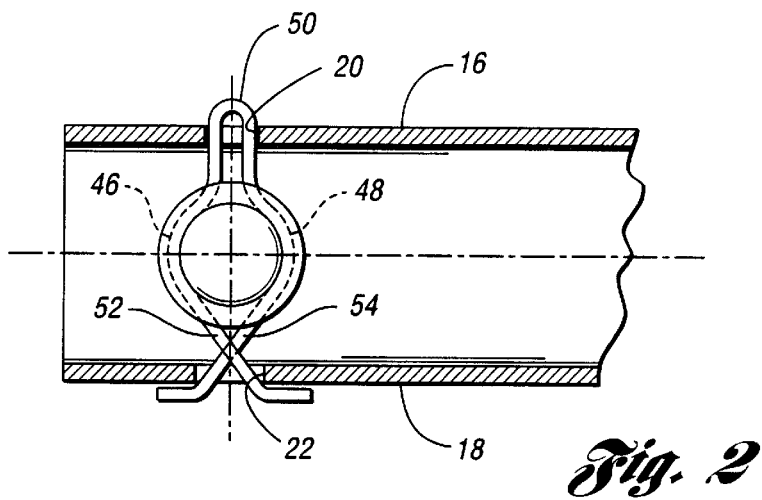
*Fig. 2*
*Fig. 3*
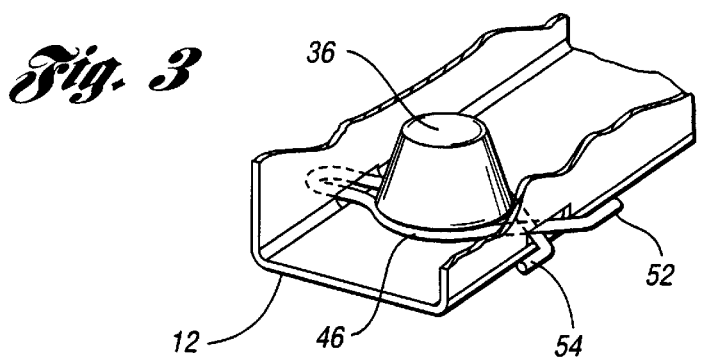

VEHICLE SEAT TRACK ATTACHMENT ASSEMBLY

TECHNICAL FIELD

The present invention relates to a vehicle seat track attachment assembly including a fixation spring to facilitate quick attachment of a seat track to a vehicle floor pan.

BACKGROUND ART

Typically, a vehicle seat assembly includes a track section which is generally U-shaped and configured to receive a sliding portion of the seat assembly to facilitate fore and aft adjustment of the seat assembly on a vehicle floor pan. The seat track section is typically bolted to an aperture in the vehicle floor pan. This bolting operation requires the manufacturing and alignment of corresponding holes in the seat track and floor pan. The assembly process may sometimes be difficult because access for installation of a bolt on the track section may be restricted by the configuration of the seat assembly and its underside components, such as drive motors, etc. This limited access also adversely affects servicing of the seat track assembly.

Accordingly, it is desirable to provide an improved method and apparatus for securing a seat track assembly to a vehicle floor pan in which tolerance for location of holes is relaxed, and problems associated with limited access are minimized.

DISCLOSURE OF INVENTION

The present invention overcomes the above-referenced shortcomings of prior art seat track assemblies by providing a seat track attachment assembly which includes a fixation spring engageable with a head of an attachment bolt for removably securing a seat track to a vehicle floor pan.

More specifically, the present invention provides a seat track attachment assembly for attachment to an aperture in a vehicle floor pan, including a seat track having an opening therein and an attachment bolt extending through the floor pan aperture and the seat track opening. The bolt has a shaft and a head with a head width narrower than the opening. A fixation spring engaging the seat track is positioned around the shaft and abuts the head to secure the seat track to the floor pan.

In a preferred embodiment, the fixation spring includes a protruding portion extending through a hole in a first side wall of the seat track, and opposing legs extending through a hole formed in a second side wall of the seat track. This configuration allows the spring to be pre-attached to the seat track before the spring is engaged with the attachment bolt.

The invention also contemplates a method of attaching a seat track to an aperture in a vehicle floor pan, wherein the seat track has an opening therein. The method includes the steps of: a) securing a fixation spring to the seat track in alignment with the opening; b) positioning the seat track on the floor pan with the seat track opening in alignment with the floor pan aperture; and c) attaching an attachment bolt through the floor pan aperture and seat track opening and engaging a head of the attachment bolt with the fixation spring to secure the seat track to the floor pan.

Accordingly, an object of the invention is to provide an attachment assembly which provides quick attachment and detachment of a seat track to a vehicle floor pan with limited access thereto.

Another object of the invention is to provide an improved seat track attachment assembly which eases hole location tolerance requirements and eases assembly of the seat track to the floor pan.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 1 shows a vertical cross-sectional view of a seat track assembly and floor pan in accordance with the present invention;

FIG. 2 shows a sectional view taken at line 2—2 of FIG. 1; and

FIG. 3 shows a cut-away, perspective view of the assembly of FIG. 1.

DETAILED DESCRIPTION OF THE PREFERRED EMBODIMENT

Referring to FIGS. 1–3, the seat track assembly 10 of the present invention includes a seat track 12 having an opening 14 therein and first and second side walls 16, 18 having first and second holes 20, 22 therein, respectively.

The seat track 12 is positioned on a floor pan 24 of a vehicle such that the aperture 26 of the floor pan 24 is aligned with the hole 14 in the seat track 12.

An attachment bolt 30 is extended through the floor pan aperture 26 and the seat track opening 14. The attachment bolt 30 includes a shaft 32, a threaded portion 34, and a head 36 which is substantially cone-shaped, i.e. it is tapered such that it is narrower at its top than its bottom. The head has a head width narrower than the opening 14 to facilitate insertion of the head 36 through the opening 14.

A nut 38 threadably engages the threaded portion 34, and a washer 40 is provided between the nut 38 and the floor pan 24.

A fixation spring 44 includes curved portions 46, 48 which are fitted around the shaft 32, and a protruding portion 50 which extends through the first hole 20 in the first wall 16. Opposing legs 52, 54 extend through the second hole 22 in the second wall 18. As shown in FIG. 2, the opposing legs 52, 54 cross each other such that they may be pushed together to disengage the spring 44 from the attachment bolt 30.

The curved portions 46, 48 of the fixation spring 44 abut the head 36 of the attachment bolt 30 to secure the seat track 12 to the floor pan 24. This structure provides for fixation of the seat track 12 to the floor pan. It is contemplated that, in the preferred embodiment, this assembly would be used only at the front of the track, and the rear of the track would be fixed conventionally. However, variations are contemplated within the scope of the present invention.

This method and apparatus enables accurate self-location of the track sections and negates the need for assembly of bolts at the front of the track section. An advantage of this system is the ease of service for removing the track sections without loss of strength of the assembly.

The method is also cost-effective and requires only a simple low cost fixation spring, which is preferably a spring steel component and is universal for left-hand and right-hand tracks. Also, the simple attachment bolt could be cold-formed inexpensively.

Preferably, the fixation spring 44 is pre-located within the seat track 12 by extending the protruding portion 50 of the spring 44 through the first hole 20, and the legs 52, 54 of the spring 44 through the second hole 22. The holes 20, 22 are preferably pierced holes formed in the side walls of the seat track.

In order to assemble the seat track to the vehicle floor, the seat track 12 is positioned over the attachment bolt 30 at the front and located via access through the clearance hole 14 in the seat track. When the fixation spring 44 is centrally located on the attachment bolt 30, applied vertical pressure will force open the spring 44 which will locate finally underneath the head 36 of the attachment bolt, thereby fixing the seat track 12 in position on the floor pan 24. The rear track fixings (i.e. bolts) may now be positioned accurately for bolt fixation.

The seat track is easily released by squeezing the legs 52, 54 of the fixation spring 44 together. Accidental release could be prevented by adapting the legs 52, 54 to be released only by service dealership tooling.

A method in accordance with the present invention contemplates the steps of: a) securing a fixation spring to the seat track in alignment with the opening in the seat track; b) positioning the seat track on the floor pan with the seat track opening in alignment with the floor pan aperture; and c) attaching the attachment bolt through the floor pan aperture and seat track opening and engaging a head of the attachment bolt with the fixation spring to secure the seat track to the floor pan. The step of securing the fixation spring preferably comprises providing the first and second holes in the first and second side walls, respectively, of the seat track, and inserting the protruding portion of the fixation spring through the first hole and inserting the legs of the fixation spring through the second hole (not necessarily in the order listed).

While the best mode for carrying out the invention has been described in detail, those familiar with the art to which this invention relates will recognize various alternative designs and embodiments for practicing the invention within the scope of the appended claims.

What is claimed is:

1. A seat track attachment assembly for attachment to an aperture in a vehicle floor pan, the assembly comprising:
    a seat track having an opening therein;
    an attachment bolt extending through the floor pan aperture and the seat track opening, said bolt having a shaft and a head with a head width narrower than said opening; and
    a fixation spring engaging the seat track and positioned around the shaft and abutting the head to secure the seat track to the floor pan.

2. The seat track attachment assembly of claim 1, wherein said fixation spring comprises opposing legs which are movable for disengaging the spring to detach the attachment bolt.

3. The seat track attachment assembly of claim 1, wherein said head is tapered such that it is narrower at its top than its bottom to facilitate attachment of the fixation spring over the head.

4. The seat track attachment assembly of claim 2, wherein said seat track includes first and second side walls with first and second holes therein, respectively, with said legs extending through said first hole and said fixation spring having a protruding portion extending through the second hole.

5. The seat track attachment assembly of claim 1, wherein said attachment bolt includes a threaded portion with a nut attached thereto.

6. The seat track attachment assembly of claim 2, wherein said opposing legs cross each other such that distal ends of the legs are configured to be squeezed together to disengage the spring.

7. A method of attaching a seat track to an aperture in a vehicle floor pan, wherein the seat track has an opening therein, the method comprising:
    securing a fixation spring to the seat track in alignment with the opening;
    positioning the seat track on the floor pan with the seat track opening in alignment with the floor pan aperture; and
    attaching an attachment bolt through the floor pan aperture and seat track opening and engaging a head of the attachment bolt with the fixation spring to secure the seat track to the floor pan.

8. The method of claim 7, wherein said step of securing a fixation spring comprises providing first and second holes in first and second side walls, respectively, of the seat track, and inserting a protruding portion of the fixation spring through the first hole and inserting legs of the fixation spring through the second hole.

9. A seat track attachment assembly for attachment to an aperture in a vehicle floor pan, the assembly comprising:
    a seat track having an opening therein and first and second side walls with first and second holes therein, respectively;
    an attachment bolt extending through the floor pan aperture and the seat track opening, said bolt having a shaft and a head with a head width narrower than said opening; and
    a fixation spring engaging the seat track and positioned around the shaft and abutting the head to secure the seat track to the floor pan, said fixation spring having a protruding portion extending through the first hole and opposing legs extending through the second hole to secure the fixation spring to the seat track prior to attachment of the fixation spring to the attachment bolt.

10. The seat track assembly of claim 9, wherein said head is tapered such that it is narrower at its top than its bottom to facilitate attachment of the fixation spring over the head.

11. The seat track assembly of claim 9, wherein said attachment bolt includes a threaded portion with a nut attached thereto.

* * * * *